ABSTRACT

United States Patent [19]

Fischer

[11] 4,419,162

[45] Dec. 6, 1983

[54] VINYL REPAIR COMPOSITION AND METHOD

[75] Inventor: Theodore E. Fischer, Birmingham, Ala.

[73] Assignee: Polyplex Plastics, Inc., Rochester, N.Y.

[21] Appl. No.: 299,814

[22] Filed: Sep. 8, 1981

[51] Int. Cl.³ ........................ B29H 19/00; B32B 35/00
[52] U.S. Cl. ...................................... 156/94; 427/140; 524/113; 524/233; 264/36
[58] Field of Search ............................. 427/400, 140; 260/30.4 R, 29.6 WQ, 32.6 R; 264/36; 156/94; 524/113, 233

[56] References Cited

U.S. PATENT DOCUMENTS

| | | | |
|---|---|---|---|
| 2,215,340 | 9/1940 | Vasen | 260/29.6 WQ |
| 2,255,229 | 9/1941 | Reppe et al. | 524/113 |
| 2,758,104 | 8/1956 | Adelman | 524/113 |
| 3,215,663 | 11/1965 | Weisberg | 260/32.6 R |
| 3,920,497 | 11/1975 | Speer | 156/94 |
| 3,926,895 | 12/1975 | Britain | 260/30.4 R |
| 3,974,118 | 8/1976 | Samways et al. | 524/113 |
| 4,013,495 | 3/1977 | Golumbic | 427/140 |
| 4,166,171 | 8/1979 | Mitchell | 260/32.6 R |

FOREIGN PATENT DOCUMENTS 52-14674  2/1977  Japan .................... 156/94

OTHER PUBLICATIONS

A.C.S. Advances in Chemistry Series 125, American Chemical Society, Washington, D.C. 1973, Nakajima p. 107.

*Primary Examiner*—Joseph L. Schofer
*Assistant Examiner*—N. Sarofim
*Attorney, Agent, or Firm*—Cumpston & Shaw

[57] ABSTRACT

This invention relates to the repair of tears in vinyl chloride such as naugahyde, particularly when such materials form part of a covered seating material, by using a composition containing a vinyl chloride-vinyl acetate copolymer in an organic solvent.

6 Claims, No Drawings

VINYL REPAIR COMPOSITION AND METHOD

BACKGROUND OF THE INVENTION

Many methods of vinyl repair have been attempted over the years with little or no success because the mend did not hold and/or the filter would not remain pliable with age. The various glues used did not hold up for prolonged periods of time. In addition, the resulting repairs were not flexible which can result in a tear in the seat or other parent material alongside of the repair.

SUMMARY OF THE INVENTION

There exists a need for a vinyl repair composition and method which will provide a simple method of repairing vinyl material to provide a strong flexible bond. Such a composition and method are the basis of the present invention.

The present invention is based on the discovery of a unique composition comprising a copolymer of vinyl chloride and vinyl acetate in a solvent system. This composition produces on curing a strong bond which is in fact stronger than the parent material. The bond formed is also flexible. The composition is readily applied, stable on storage and is cold cured. It is unnecessary to apply heat to cure the composition.

Accordingly, one aspect of the invention relates to a composition for repairing flexible vinyl seating material. Another aspect relates to a cold cure method of repairing flexible vinyl and a further aspect relates to a kit for repairing flexible vinyl material.

DESCRIPTION OF THE PREFERRED EMBODIMENT

Vinyl seating material is extensively used in private homes, automobiles, restaurants and countless other areas where there are chairs, benches or stools for seating people. They generally withstand normal wear exceedingly well. However, if they should be torn, either accidentally or by acts of vandalism, they are difficult to repair. Also, since they are used extensively in areas where people smoke, they often receive cigarette burns. Because of the problems with prior art repair kits and methods, the damage is often times repaired by simply covering the damaged area with tape. This is particularly true since the alternative is often to have the item reupholstered. This of course is not only an expensive alternative but usually requires that the chair, bench or stool, be removed from service for prolonged periods of time. The time that the furniture is removed for repair can be quite costly in lost seating capacity.

In addition, reupholstering is often necessitated not because of the size of the tear but because of the importance of the aesthetic appearance of the item because there is no conventional repair procedure, short of reupholstering which is aesthetically appealing until the advent of the present method.

The method of repairing vinyl upholstery varies depending upon the size and characteristics of the tear, rip or burn. Such factors as whether the burn penetrates the base vinyl material must be considered. The composition and methods of the present invention are adaptable to repair a tear or burn of any size or shape. Perhaps the easiest to repair is a burn or cut which has not penetrated the base material. To repair such a burn, the hole is simply filled with the vinyl repair chemical composition in a first coat. A vinyl dye, or any compatible dye for that matter, if necessary, is then sprayed on the cured surface to match the color of the base material. The dye could be included in the repair composition, if desired. The vinyl repair chemical composition is allowed to cure for about 30 minutes. The application of heat is unnecessary.

For burns which have penetrated the vinyl material, a more elaborate procedure is employed. In this procedure, a piece of vinyl cloth is cut out as an underlay for the hole that goes all the way through the vinyl material. The size of the underlay is sufficient to cover the hole and provide some overlap between the periphery of the hole and the undamaged vinyl material adjacent thereto. The underlay is inserted in the hole with the aid of a probe, which may be a screwdriver or spatula-like device. It is spread out and oriented to completely cover the hole and adjacent periphery. There may be some instances in which the vinyl may have to be backed up with sufficient packing material to hold against the surface of the item being repaired. The composition of the present invention is now applied into the cigarette burn hole, under the edges of the hole and over the underlay vinyl cloth. The vinyl composition is applied under the edges of the scarred vinyl to attach the base vinyl to the underlay. After this step is completed, the next step is the application of an adhesive tape, preferably masking tape, over the filled hole so that the edges of the scarred seat can be held tightly against the underlay till cured. The curing time is approximately thirty minutes. The tape is then carefully pulled off the cure, filled and repaired cigarette hole. In some instances, an additional coat of vinyl repair material is added to produce a matching texture and a dye is added to match the color of the repair to that of the background material. This is the last step of the process for the repair of a deep cigarette burn.

In addition to cigarette burns and tears, the present method and composition is effective for repairing splits in the seams of the seating material. For a small split, this may be simply done by applying the composition to the split and taping the split together. The tape holds the split in a repaired position for sufficient time to allow curing of the composition. After curing, the tape is removed.

Large seam splits may be repaired by the method and composition of the present invention. First, a piece of underlay material is cut out, the size of which is one inch wider all around than the dimensions of the repair. The underlay is partially inserted into the seam split and spread out in the split using a probe. The vinyl repair composition is then inserted under the edges as well as underneath the seat in the areas where the piping has been separated from the vinyl material. Masking tape is applied to pull together the two parts of the split. The torn edges are pulled together with the masking tape. Masking tape is then applied in all areas to hold the separated edges together and allow the vinyl composition to cure for about thirty to sixty minutes. The tape is then removed from the large split and the repair inspected to see if additional vinyl material is needed to be inserted to complete the repair. If additional material is needed, it is applied and then the repair again taped to hold the split material in the proper position during the curing of the vinyl composition. After the split is completely repaired and filled with the vinyl composition, it may be dyed using conventional dyes to match the color of the base material.

The preset composition and method may also be used to repair right-angled tears and slashes. The tear or slash is first inspected and the underlay is cut and inserted into the tear. The underlay is again spread out with a probe. Of course, filler material may be added if necessary. The vinyl repair composition is then applied to the underlay under the edges of the tear. Masking tape is then applied to first draw the edges of the tear together. After that, each piece of tape covers the tear itself or is used to bring the edges of the tear together as closely as possible. The tear is held in position with the masking tape until the vinyl repair composition is cured which will take about thirty minutes. The tape is then removed and the repair area assessed to see if further additions of vinyl material need to be added and whether the vinyl material needs to be dyed to match the base material.

The present method and composition may also be used to fill holes where there has been a loss of material. The hole is first trimmed so as to make its edges smooth and essentially perpendicular, prior to the application of underlay material. Of course, it may be necessary to add filler material which may be done at this time. The underlay material is cut to the appropriate size, folded, and inserted into one edge of the hole under the vinyl material to be repaired. The vinyl material is inserted under the other edge and spread out with a blunt tool such as a probe.

The vinyl repair composition is then applied under the edges of the hole. Two vertical pieces of masking tape are then applied to the area of the hole by their opposite ends and the loosened ends pulled together to bring the edges of the tear as closely together as possible and to prevent wrinkling of the seat. Then, horizontal tapes are applied to cover the underlay until cured to hold the repair in place. The tape is removed from the large underlaid hole.

A piece of masking tape is applied to form the basis of a pattern for the inlay. The masking tape is drawn on by means of a pen or any convenient instrument. More than one piece of masking tape may be necessary in forming the pattern for the inlay to cover a larger hole. After it is completely covered with masking tape, the inlay pattern is drawn on by a pen and the masking tape is removed from the hole. The masking tape is then applied to the inlay cloth which may be then cut according to the size of the mask drawn on the masking tape. The masking tape is removed from the pattern and the inlay cloth is layed over the hole.

The vinyl composition of the present invention is then applied over the entire surface of the underlay after the inlay material has been removed and it has been determined that there is an adequate fit. The inlay material is now placed over the vinyl material and sufficient tape applied to hold it in place. The vinyl composition is allowed to cure and after curing the tape is removed. The repair is inspected to see if additional vinyl material is needed. If so, it is added and dyed to match the background material.

The vinyl repair composition of the present invention comprises a copolymer of vinyl chloride and vinyl acetate having a high molecular weight in the range of approximately 35,000. It is preferred that the copolymer consists of about 90% vinyl chloride and about 10% vinyl acetate. A particularly preferred copolymer is a copolymer comprising 90% vinyl chloride and 10% vinyl acetate having a molecular weight of about 35,000 and is sold by Union Carbide under the name VYNS-3.

In addition to the copolymer, a solvent system is needed to provide a viscous liquid which may readily be applied to the surface to be repaired. The solvent system is organic based and comprises a mixture of tetrahydrofuran (THF) and dimethlformamide (DMF). The amount of THF should be approximately five times the amount of DMF in the solvent system. In addition, it is preferable to add a plasticiser such as dioctyl phthalate and a small amount of water. The composition of the solvent system is important as inevitably, it will come in contact with the adhesive of the masking tape. The solvent system has also been selected so as to provide a proper rate of drying and release of the adhesive tape.

A particularly preferred composition contains 100 parts VYNS-3, 250 parts THF, 48 parts DMF, 40 parts dioctyl phthalate (DOP) and 3.3 parts water. This composition has a particularly preferred combination of properties for use in the present method.

The viscosity of the composition is such as to allow it to be readily flowable so that it may be easily applied to the underportions of the repair area. It is preferred to apply the composition through a conventional oil can having a pump handle and a flexible delivery channel. This enables precise controlled application of the composition to the repair area.

The composition of the present invention may be prepared as follows:

EXAMPLE

A two-liter resin kettle, two-blade stainless steel stir and heating mantle are appropriately assembled. The materials to form the composition are grouped into three separate groups. The first group comprises 400 g of tetrahydrofuran, 228 g of NN-dimethylformamide, 16 g distilled water and 192 g of dioctyl phthalate. 480 g of a vinyl chloride-vinyl acetate copolymer VYNS-3 is weighed out which comprises the second group.

An additional 800 g of tetrahydrofuran is weighed out and retained as the third group.

The vinyl copolymer is sifted through 40 mesh screen and the stirrer is set on the lowest gear.

The THF, DMF, water and DOP are added to the flask and allowed to mix. Then the copolymer is slowly added to the solvent mixture until about ⅔ has been added. At this time the remaining THF is added in along with the remaining copolymer and the composition mixed until a homogeneous mixture is obtained. The mixture, which is the preferred vinyl repair composition of the present invention, has a solids content of 34.7% and a viscosity of 2109 cps.

In addition to vinyl, the compositions and methods of the present invention may be used to repair leather and leather-like materials.

In the proceeding description of the invention, it is not essential that vinyl sheet material be the same type as that of the base material be used. In fact, a non-vinyl material may be used as the inlay such as cheese-cloth or the like. Most vinyl seating material is composed of a fabric impregnated with a vinyl material, such as flexible vinyl chloride. Therefore another advantage of the present invention is that the inlay does not have to be made of the same material as the base, since it is often difficult to find a similar base material.

What is claimed is:

1. A vinyl repair composition comprising a copolymer of vinyl chloride and vinyl acetate having a molecular weight of about 35,000; a solvent comprising tetrahydrofuran and dimethylformamide in an amount selected to provide a viscous flowable composition; and an amount of water selected to cause the composition, when dried, to release from adhesive tape.

2. The composition of claim 1 which contains dioctylphthalate.

3. The composition of claim 1 or 2 wherein the vinyl chloride is present in about 90%.

4. A method of repairing holes in vinyl material comprising filling said hole with the vinyl repair composition of claim 1.

5. The method of claim 4, further comprising the step of covering the hole and the vinyl repair composition in the hole with masking tape.

6. The composition of claim 1 comprising the following ingredients in the indicated relative amounts:
Vinyl Chloride: 90 Parts
Vinyl Acetate: 10 Parts
Tetrahydrofuran: 250 Parts
Dimethylformamide: 48 Parts
Dioctylphthalate: 40 Parts
Water: 3.3 Parts.

* * * * *